(12) United States Patent
Yasui et al.

(10) Patent No.: US 11,017,666 B2
(45) Date of Patent: May 25, 2021

(54) VEHICLE CONTROL SYSTEM, VEHICLE CONTROL METHOD, AND PROGRAM

(71) Applicant: HONDA MOTOR CO., LTD., Tokyo (JP)

(72) Inventors: Yuji Yasui, Wako (JP); Hisao Asaumi, Wako (JP); Shion Tokunaga, Wako (JP); Masashi Yuki, Wako (JP); Yo Ito, Tokyo (JP); Hirotaka Uchitomi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/619,494

(22) PCT Filed: Jun. 8, 2018

(86) PCT No.: PCT/JP2018/022028
§ 371 (c)(1),
(2) Date: Dec. 5, 2019

(87) PCT Pub. No.: WO2018/230461
PCT Pub. Date: Dec. 20, 2018

(65) Prior Publication Data
US 2020/0160707 A1 May 21, 2020

(30) Foreign Application Priority Data
Jun. 16, 2017 (JP) .............................. JP2017-118916

(51) Int. Cl.
*G08G 1/123* (2006.01)
*G05D 1/00* (2006.01)
(Continued)

(52) U.S. Cl.
CPC ........... *G08G 1/123* (2013.01); *G05D 1/0088* (2013.01); *G05D 1/0214* (2013.01);
(Continued)

(58) Field of Classification Search
CPC .... G08G 1/123; G05D 1/0088; G05D 1/0214; G05D 1/0276; G05D 1/0297;
(Continued)

(56) References Cited

U.S. PATENT DOCUMENTS

2017/0370744 A1* 12/2017 Miyajima ............... G01C 21/26
2019/0329771 A1* 10/2019 Wray .................... B60W 30/09

FOREIGN PATENT DOCUMENTS

| JP | 2000-089665 | 3/2000 |
|----|-------------|--------|
| JP | 2016-126713 | 7/2016 |
| WO | 2016/121174 | 8/2016 |

OTHER PUBLICATIONS

International Search Report and Written Opinion for International Application Serial No. PCT/JP2018/022028 dated Sep. 11, 2018, 6 pages.

* cited by examiner

*Primary Examiner* — Hai Phan
*Assistant Examiner* — Anthony D Afrifa-Kyei
(74) *Attorney, Agent, or Firm* — Amin, Turocy & Watson, LLP

(57) ABSTRACT

The present invention provides a vehicle control system including an acquisition unit that acquires information relating to a situation of a transit point of autonomous driving, and a determination unit that determines whether an autonomously driven vehicle will pass the transit point based on the information acquired by the acquisition unit.

9 Claims, 14 Drawing Sheets

(51) Int. Cl.
  *G05D 1/02*       (2020.01)
  *G06Q 10/10*      (2012.01)
  *G06Q 50/30*      (2012.01)
  *B60W 60/00*      (2020.01)

(52) U.S. Cl.
  CPC ....... *G05D 1/0276* (2013.01); *G06Q 10/1097* (2013.01); *G06Q 50/30* (2013.01); *B60W 60/001* (2020.02)

(58) Field of Classification Search
  CPC ................ G05D 1/021; G05D 1/0287; G05D 2201/0211; G06Q 10/1097; G06Q 50/30; G06Q 10/06315; G06Q 10/1095; B60W 60/001; B60W 30/10; B60P 3/32
  See application file for complete search history.

| | MONDAY | TUESDAY | WEDNESDAY | THURSDAY | FRIDAY | SATURDAY | SUNDAY |
|---|---|---|---|---|---|---|---|
| | y/m/d | y/m/d | y/m/d | y/m/d | y/m/d | y/m/d | y/m/d |
| FIRST USER UI-1 | 10:00-12:00 AWAY | AT-HOME | 10:00-12:00 AWAY | AT-HOME | 10:00-12:00 AWAY | AT-HOME | AT-HOME |
| | ⋮ | ⋮ | ⋮ | ⋮ | ⋮ | ⋮ | ⋮ |
| FIRST USER UI-2 | AT-HOME | AT-HOME | AT-HOME | 10:00-14:30 AWAY | AT-HOME | AT-HOME | AT-HOME |
| | ⋮ | ⋮ | ⋮ | ⋮ | ⋮ | ⋮ | ⋮ |

| | MONDAY | | | TUESDAY | | | WEDNESDAY | | |
|---|---|---|---|---|---|---|---|---|---|
| | y/m/d | | | y/m/d | | | y/m/d | | |
| SECOND USER U2-2 | 6:30-7:30 GOING TO WORK | AUTONOMOUS DRIVING | USE | 7:30-8:30 GOING TO WORK | AUTONOMOUS DRIVING | USE | 7:30-8:30 GOING TO WORK | AUTONOMOUS DRIVING | USE |
| | 7:30-19:00 AT WORK | | | 8:30-19:00 AT WORK | | | 8:30-19:00 AT WORK | | |
| | ⋮ | | ⋮ | ⋮ | | ⋮ | ⋮ | | ⋮ |
| SECOND USER U2-2 | 6:30-7:30 GOING TO WORK | AUTONOMOUS DRIVING | USE | 7:30-8:30 GOING TO WORK | AUTONOMOUS DRIVING | USE | 7:30-8:30 GOING TO WORK | AUTONOMOUS DRIVING | USE |
| | 7:30-17:00 AT WORK | | | 8:30-17:00 AT WORK | | | 8:30-17:00 AT WORK | | |
| | ⋮ | | ⋮ | ⋮ | | ⋮ | ⋮ | | ⋮ |

| PLACE | DEPARTURE POINT | TRANSIT POINT | DESTINATION | DESTINATION |
|---|---|---|---|---|
| | GARAGE | FIRST HOME | STATION ENTRANCE | GARAGE |
| COORDINATE | (x1, y1, z1) | (x2, y2, z2) | (x3, y3, z3) | (x1, y1, z1) |
| ASSUMED ARRIVAL TIME | 2017/*/*/6:20:00 | 2017/*/*/6:30:00 | 2017/*/*/7:30:00 | 2017/*/*/8:00:00 |

| | MONDAY | TUESDAY | WEDNESDAY | THURSDAY | FRIDAY | SATURDAY | SUNDAY |
|---|---|---|---|---|---|---|---|
| | y/m/d | y/m/d | y/m/d | y/m/d | y/m/d | y/m/d | y/m/d |
| FIRST USER U1-1 | 10:00-12:00 AWAY | AT-HOME | 10:00-12:00 AWAY | AT-HOME | 10:00-12:00 AWAY | AT-HOME | AT-HOME |
| | ... | ... | ... | ... | ... | ... | ... |
| FIRST USER U1-2 | 6:20– TAKE CARE OF GRANDSON | AT-HOME | AT-HOME | 10:00-14:30 AWAY | AT-HOME | AT-HOME | AT-HOME |
| | ... | ... | ... | ... | ... | ... | ... |

| | | MONDAY | | | TUESDAY | | | WEDNESDAY | | |
|---|---|---|---|---|---|---|---|---|---|---|
| | | y/m/d | | | y/m/d | | | y/m/d | | |
| SECOND USER A | 6:20-6:40 TRANSPORT AND SEND-OFF | AUTONOMOUS DRIVING | | 7:30-8:30 GOING TO WORK | AUTONOMOUS DRIVING | USE | 7:30-8:30 GOING TO WORK | AUTONOMOUS DRIVING | USE | ⋮ |
| | 6:40-7:30 GOING TO WORK | | USE | 8:30-19:00 AT WORK | | | 8:30-19:00 AT WORK | | | |
| | 7:30-19:00 AT WORK | | USE | ⋮ | | ⋮ | ⋮ | | | |
| | ⋮ | | ⋮ | | | | | | | |
| SECOND USER B | 6:20-6:40 TRANSPORT AND SEND-OFF | AUTONOMOUS DRIVING | | 7:30-8:30 GOING TO WORK | AUTONOMOUS DRIVING | USE | 7:30-8:30 GOING TO WORK | AUTONOMOUS DRIVING | USE | ⋮ |
| | 7:30-19:00 AT WORK | | USE | 8:30-17:00 AT WORK | | | 8:30-17:00 AT WORK | | | |
| | 7:30-17:00 AT WORK | | USE | ⋮ | | ⋮ | ⋮ | | | |
| | ⋮ | | ⋮ | | | | | | | |

VEHICLE CONTROL SYSTEM, VEHICLE CONTROL METHOD, AND PROGRAM

TECHNICAL FIELD

The present invention relates to a vehicle control system, a vehicle control method, and a program.

Priority is claimed on Japanese Patent Application No. 2017-118916, filed on Jun. 16, 2017, the contents of which are incorporated herein by reference.

BACKGROUND

A technique for deciding whether a resident is at home when his or her home is a destination, and determining a route of a vehicle that visits the home in a case where it is decided that he or she is at home is disclosed (see Patent Document 1).

RELATED ART DOCUMENTS

Patent Documents

[Patent Document 1]
Japanese Unexamined Patent Application, First Publication No. 2016-126713

SUMMARY OF INVENTION

Problems to be Solved by the Invention

In a case where an autonomously driven vehicle also visits a home, it is necessary to decide whether a resident is at home and create a plan to visit the home. However, in the technique of the related art, a decision of whether a resident is at home is not used in the allocation of an autonomously driven vehicle.

The present invention was contrived in view of such circumstances, and one object thereof is to provide a vehicle control system, a vehicle control method, and a program that make it possible to determine a route of an autonomously driven vehicle on the basis of the situation of a transit point.

Means for Solving the Problem

A vehicle control system, a vehicle control method, and a program according to this invention have the following configurations adopted therein.

(1) A vehicle control system according to an aspect of this invention is a vehicle control system including: an acquisition unit that acquires information relating to a situation of a transit point of autonomous driving; and a determination unit that determines whether an autonomously driven vehicle will pass the transit point based on the information acquired by the acquisition unit.

(2) In the aspect of the above (1), the acquisition unit acquires information relating to a first user that is the transit point and information relating to a second user that is an operation owner of the autonomously driven vehicle, and the determination unit refers to the information acquired by the acquisition unit, determines whether there is a specific relationship between the first user and the second user, and determines that the autonomously driven vehicle will pass the transit point in a case where there is the specific relationship and the autonomously driven vehicle is used by a third user.

(3) In the aspect of the above (2), the determination unit extracts a time slot of a stopover at the transit point according to an usage form of the third user based on a first schedule of the first user.

(4) In the aspect of the above (3), the determination unit narrows down a time slot serving as a candidate based on a second schedule of the second user from the extracted time slot, and determines a start time of operation of the autonomously driven vehicle in accordance with the narrowed-down time slot.

(5) In the aspect of the above (4), the vehicle control system further includes a communication unit that communicates with a terminal device of the first user, and the determination unit allows the terminal device of the first user to know information relating to the determined operation using the communication unit.

(6) In any one aspect of the above (2) to (5), the determination unit determines an usage of the third user, and sets the transit point of the autonomously driven vehicle again in a case where a change in information relating to the first user occurs in a state in which the transit point is set in the autonomously driven vehicle.

(7) In any one aspect of the above (2) to (6), the determination unit determines an usage of the third user, and sets the transit point of the autonomously driven vehicle again in a case where a change in a specific relationship between the first user and the second user occurs in a state in which the transit point is set in the autonomously driven vehicle.

(8) In the aspect of the above (4) or (5), the determination unit reflects the operation start time in the second schedule.

(9) A vehicle control method according to an aspect of this invention is a vehicle control method including causing a computer to: acquire information relating to a transit point of an autonomously driven vehicle, executor information of the autonomously driven vehicle that uses the information relating to the transit point, and user information of the autonomously driven vehicle; and determine whether the autonomously driven vehicle will pass the transit point based on the acquired information.

(10) In the aspect of the above (9), the vehicle control method further includes: acquiring the information relating to the transit point of the autonomously driven vehicle through a first interface; transmitting the executor information of the autonomously driven vehicle to a terminal device and acquiring the information relating to the transit point through a second interface; communicating with the autonomously driven vehicle and acquiring information of the autonomously driven vehicle through a third interface; and calculating whether the autonomously driven vehicle will pass the transit point based on the information acquired from the first interface, the second interface and the third interface.

(11) In the aspect of the above (10), the vehicle control method further includes: performing authentication by a first authentication unit that allows information acquisition through the first interface; performing authentication by a second authentication unit that allows information acquisition through the second interface; and transmitting the information of the autonomously driven vehicle acquired from the third interface through the first interface or the second interface based on authentication results of the first authentication unit and the second authentication unit.

(12) In the aspect of the above (11), the vehicle control method further includes: acquiring information relating to a first user that is the transit point and information relating to a second user that is an operation owner of the autonomously driven vehicle, referring to the acquired information, and determining whether there is a specific relationship between the first user and the second user; and communicating with a terminal device of the first user, and allowing the terminal device of the first user to know information relating to the determined operation in a case where there is the specific relationship and the autonomously driven vehicle is used by a third user.

(13) A program according to an aspect of this invention is a program causing a computer to: acquire information relating to a transit point of an autonomously driven vehicle, executor information of the autonomously driven vehicle that uses the information relating to the transit point, and user information of the autonomously driven vehicle; and determine whether the autonomously driven vehicle will pass the transit point based on the acquired information.

Advantage of the Invention

According to (1), (9), (10) or (13), the vehicle control system can determine the operation schedule of the autonomously driven vehicle by determining the situation of the transit point of autonomous driving.

According to (2), the vehicle control system can determine a route of the autonomously driven vehicle to leave the third user attempted to be left by the second user by determining the situation of the first user, and can smoothly perform the allocation of the autonomously driven vehicle.

According to (3), the vehicle control system can smoothly set a schedule to pass the first user's base by extracting a time slot in which the third user attempted to be left by the second user can be left from the first schedule of the first user.

According to (4), the vehicle control system narrows down the time slot extracted from the first schedule of the first user on the basis of the second schedule of the second user, and thus can reliably determine the start time of operation of the autonomously driven vehicle.

According to (5) or (12), the vehicle control system is configured such that the first user can know the operation start time, and the first user can make preparations for accepting the third user attempted to be left by the second user.

According to (6) or (7), the vehicle control system can change a route depending on the situation even in a case where the situation of a transit destination changes while the autonomously driven vehicle is traveling in an originally determined route.

BRIEF DESCRIPTION OF THE DRAWINGS

FIG. 2 is a diagram showing an example of content of a first schedule 351 according to the embodiment.

FIG. 3 is a diagram showing an example of content of a second schedule 352 according to the embodiment.

FIG. 7 is a diagram showing an example of content of route information 561 which is generated by a schedule determination unit 530 according to the embodiment.

FIG. 12 is a diagram showing an example of content of the updated first schedule 351 according to the embodiment.

FIG. 13 is a diagram showing an example of content of the updated second schedule 352 according to the embodiment.

DESCRIPTION OF THE EMBODIMENTS

Hereinafter, an embodiment of a vehicle control system of the present invention will be described with reference to the accompanying drawings.

[Vehicle Control System]

Figure 1:
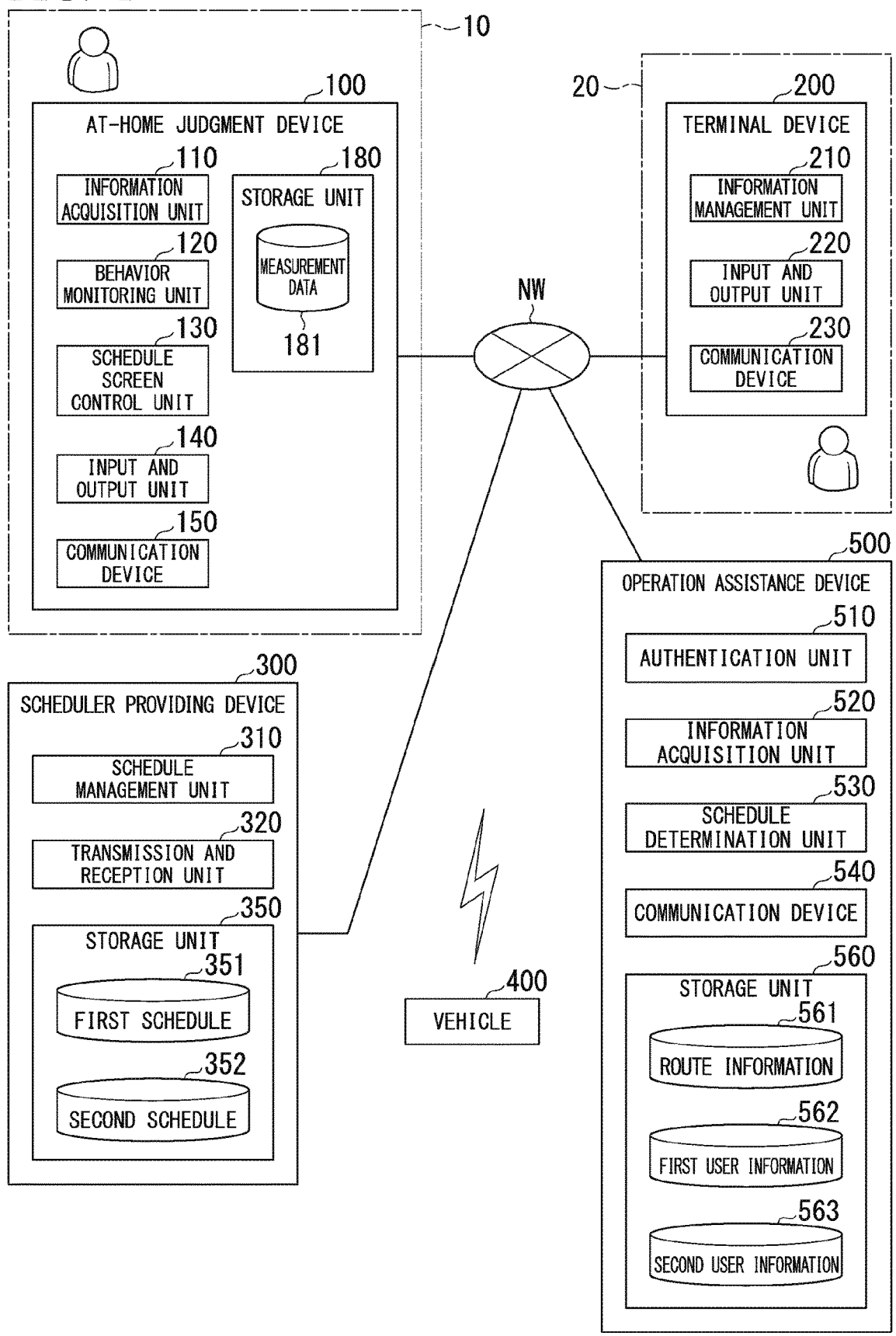
FIG. 1 is a diagram showing an example of a configuration of a vehicle control system 1 according to an embodiment.

FIG. 1 is a diagram showing an example of a configuration of a vehicle control system 1 according to the embodiment. The vehicle control system 1 includes, for example, an at-home judgment device 100 and an operation assistance device 500. The at-home judgment device 100 and the operation assistance device 500 mutually communicate with a terminal device 200, a scheduler providing device 300 and a vehicle 400 through a network NW. The network NW includes, for example, the Internet, a wide area network (WAN), a local area network (LAN), a public line, a provider terminal, a wireless communication network, or the like. In a case where some or all of the functions of the operation assistance device 500 are mounted in the vehicle 400, the vehicle control system 1 may include the vehicle 400 (strictly, an in-vehicle device). The scheduler providing device 300 and the operation assistance device 500 may be an integrated service server.

The at-home judgment device 100 is installed in or introduced into a first home 10 in which a first user resides or abides. The terminal device 200 is used by a second user who resides in a second home 20. The first home 10 or the second home 20 may be a hotel, an inn, or a rented house such as a weekly rental condominium. The second user is, for example, a parent of a third user who is a child. The first user is a person having a specific relationship with the second user, and is, for example, a parent of the second user, that is, grandparents of the third user. The operation assistance device 500 determines the at-home situation of the first user using the at-home judgment device 100 through the network NW, adjusts a schedule using the scheduler providing device 300, and plans allocation of the vehicle 400 for taking the third user to and from the first home.

[Staying-Home Judgment Device]

The at-home judgment device 100 determines whether the first user abides in the first home 10. In addition, the at-home judgment device 100 may be a home security device that monitors a change in behavior of the first user to generate a schedule and performs confirmation of the safety of the first user, or may be a general-purpose device such as a personal computer, a smartphone, or a tablet terminal. In the at-home judgment device 100, firmware, an application program, a browser, or the like is started up, and services to be described below are supported.

The at-home judgment device 100 includes, for example, an information acquisition unit 110, a behavior monitoring unit 120, a schedule screen control unit 130, an input and output unit 140, a communication device 150, and a storage unit 180.

Measurement data 181 acquired by the behavior monitoring unit 120 is stored in the storage unit 180. The storage unit 180 is realized by, for example, a random access memory (RAM), a read only memory (ROM), a hard disk drive (HDD), a flash memory, a hybrid-type storage device in which a plurality of elements among them are combined, or the like. The communication device 150 includes, for example, a network interface card (NIC) for connection to the network NW. In addition, the communication device 150 may include a wireless communication module.

The behavior monitoring unit 120 and the schedule screen control unit 130 are realized by a processor such as, for example, a central processing unit (CPU) executing a program (software). In addition, some or both of these functional units may be realized by hardware such as a large scale integration (LSI), and application specific integrated circuit (ASIC), or field-programmable gate array (FPGA), or may be realized by software and hardware in cooperation. The program may be stored in a storage device (for example, a storage unit 350) such as a hard disk drive (HDD) or a flash memory in advance, may be stored in a detachable storage medium such as a DVD or a CD-ROM, or may be installed in the storage device by the storage medium being mounted in a drive device (not shown).

The information acquisition unit 110 acquires, for example, data obtained by individually measuring the power consumption of a plurality of household electrical appliances installed in the first home 10, and causes the storage unit 180 to store the acquired data as measurement data 181 which is time-series data. The information acquisition unit 110 acquires, for example, data measured for each household electrical appliance from an electric power meter provided on a household electrical appliance, an electric outlet or the like. In addition, the information acquisition unit 110 may monitor a wiring lead into a household, perform fast Fourier transform (FFT) analysis or the like on a flowing current waveform to individually specify household electrical appliances, and acquire the same analysis data as that measured for each household electrical appliance.

The behavior monitoring unit 120 determines whether the first user is at home on the basis of the measurement data 181 stored in the storage unit 180. The behavior monitoring unit 120 may further automatically generate a life schedule in which daily life activities of the first user are represented in the form of a schedule on the basis of the measurement data 181.

The behavior monitoring unit 120 determines whether the first user is at home on the basis of, for example, a change in the power consumption of household electrical appliances such as a television or an air conditioner. For example, in a case where the power consumption of household electrical appliances falls within a certain range as compared with power consumption in a period in which at-home is ascertained, the behavior monitoring unit 120 determines that the first user is at home. Alternatively, in a case where the power consumption of household electrical appliances falls within a range of distribution estimated to be at home among distributions of the past power consumption, the behavior monitoring unit 120 determines that the first user is at home.

In addition, the behavior monitoring unit 120 cuts out the measurement data 181 at every time slot, and analyzes each cut-out measurement data, to thereby generate the first user's life schedule (particularly, the presence or absence of at-home). For example, in a case where the power consumption of household electrical appliances at every time slot falls within a certain range, the behavior monitoring unit 120 generates a life schedule indicating that the first user is at home at the time slot on the basis of the measurement data 181. The behavior monitoring unit 120 transmits the generated life schedule to the scheduler providing device 300 to be described later. The scheduler providing device 300 generates a first schedule 351 of the first user on the basis of the life schedule.

The life schedule of the first user may be input by the first user. The first user's input operation is performed on, for example, the input and output unit 140 of the at-home judgment device 100. In this case, a schedule management program in the at-home judgment device 100 is started up, and the first schedule 351 is updated through access to the scheduler providing device 300.

The schedule screen control unit 130 is realized by the schedule management program, acquires information for displaying a schedule screen through access to the scheduler providing device 300 in addition to acceptance of the above input, and causes a display device of the input and output unit to display the acquired information.

The input and output unit 140 includes, for example, a touch panel in which a display device and an input device are combined with each other. The touch panel detects the position of contact of a user on its detection surface. The input and output unit 140 displays the first schedule 351 or the second user's second schedule through control of the schedule screen control unit 130.

[Terminal Device]

The terminal device 200 is, for example, a personal computer, a smartphone, a tablet terminal, or the like. In the terminal device 200, an application program or the like is started up, and services to be described below are supported. The terminal device 200 includes, for example, an information management unit 210, an input and output unit 220, a communication device 230, and a storage unit 240.

The information management unit 210 is realized by a processor such as a CPU executing a schedule management program. In addition, this functional unit may be realized by hardware such as an LSI, an ASIC, or an FPGA, or may be realized by software and hardware in cooperation.

The input and output unit 220 includes, for example, a touch panel in which a display device and an input device are combined with each other. The touch panel detects the position of contact of a user on its detection surface.

The communication device 230 is connected to, for example, the network NW, and includes an NIC or a wireless communication module for communicating with the at-home judgment device 100 or the operation assistance device 500.

The storage unit 240 is realized by, for example, a RAM, a ROM, an HDD, a flash memory, a hybrid-type storage device in which a plurality of elements among them are combined, or the like.

The information management unit 210 uploads the second user's schedule, input to the input and output unit 220 by the second user, to the scheduler providing device 300. In addition, the information management unit 210 performs display of a query for leaving the third user as will be described later.

[Scheduler Providing Device]

The scheduler providing device 300 provides a scheduler service to the first user and the second user. The scheduler providing device 300 includes, for example, a schedule management unit 310, a transmission and reception unit 320, and a storage unit 350. The first schedule 351 which is a schedule of the first user and a second schedule 352 which is a schedule of the second user are stored in the storage unit 350. The storage unit 350 is realized by, for example, a RAM, a ROM, an HDD, a flash memory, a hybrid-type storage device in which a plurality of elements among them are combined, or the like.

The schedule management unit 310 generates the first schedule 351 on the basis of information transmitted by the at-home judgment device 100. In addition, the schedule management unit 310 updates the first schedule 351 of the first user on the basis of a life schedule transmitted by the behavior monitoring unit 120 or the first user's input operation. In addition, the schedule management unit 310 may update the first schedule 351 on the basis of the second schedule updated as will be described later.

The schedule management unit 310 generates the second schedule 352 on the basis of information transmitted by the terminal device 200. In addition, the schedule management unit 310 updates the second schedule 352 of the second user on the basis of the second user's input operation. In addition, the schedule management unit 310 updates the second schedule 352 on the basis of a process of the operation assistance device 500 as will be described later.

FIG. 2 is a diagram showing an example of content of the first schedule 351. As shown in the drawing, the first schedule 351 includes a schedule generated for each of one or more individuals (first users U1-1 and U1-2 in the drawing) included in the first user. In the first schedule 351, for example, a schedule indicating whether the first user is at the first home 10 on future days of the week and at every time slot is shown for each time slot on the calendar.

FIG. 3 is a diagram showing an example of content of the second schedule 352. The second schedule 352 includes a schedule generated for each of one or more individuals (second users U2-1 and U2-2 in the drawing) included in the second user. The second schedule 352 shows the future behaviors of the second user, and includes a schedule on days of the week and at every time slot, and data relating to use of an autonomously driven vehicle.

[Vehicle]

Figure 4:
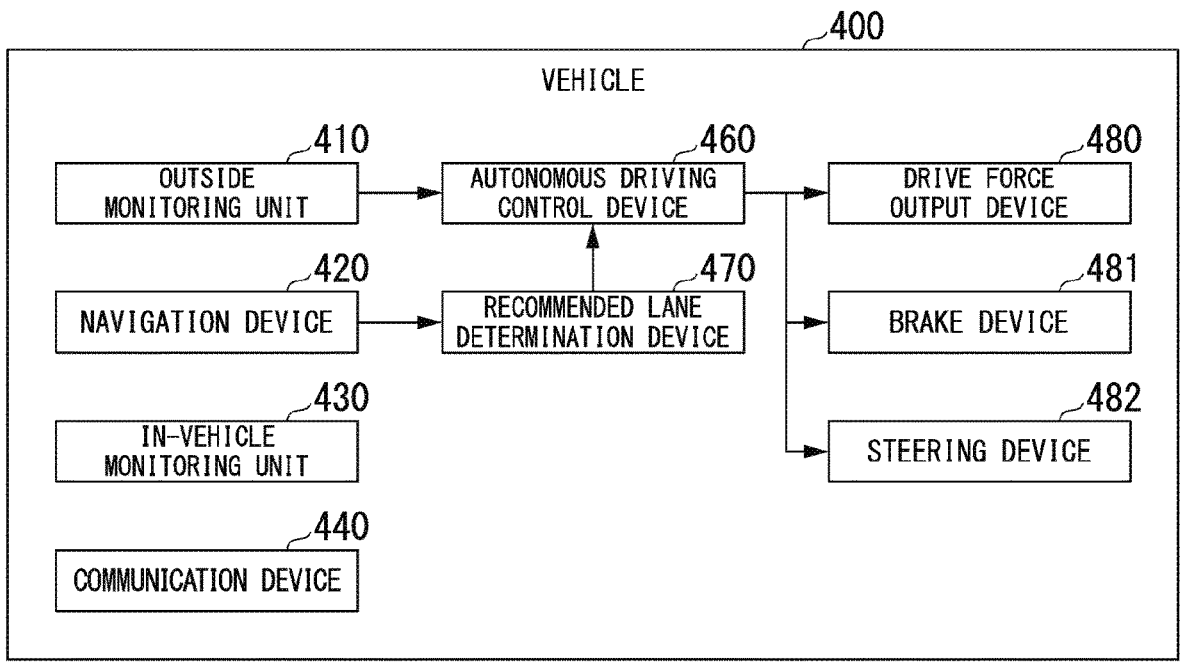
FIG. 4 is a diagram showing an example of a configuration of a vehicle 400 according to the embodiment.

FIG. 4 is a diagram showing an example of a configuration of the vehicle 400. The vehicle 400 is, for example, an autonomously driven vehicle that uses the second home 20 as a base, and does not require a driving operation. The vehicle 400 may be based in the first home 10. The vehicle 400 is, for example, a vehicle having four or more wheels, and may be vehicles other than a motorcycle. The vehicle 400 includes, for example, an outside monitoring unit 410, a navigation device 420, an in-vehicle monitoring unit 430, a communication device 440, an autonomous driving control device 460, a recommended lane determination device 470, a drive force output device 480, a brake device 481, and a steering device 482.

The outside monitoring unit 410 includes, for example, a camera, a radar, a light detection and ranging (LIDAR) sensor, an object recognition device that performs a sensor fusion process on the basis of the outputs thereof, or the like. The outside monitoring unit 410 estimates the type of object (particularly, a vehicle, a pedestrian, and a bicycle) present in the vicinity of the vehicle 400, and outputs the estimated type to the autonomous driving control device 460 together with information on the position or speed.

Figure 5:
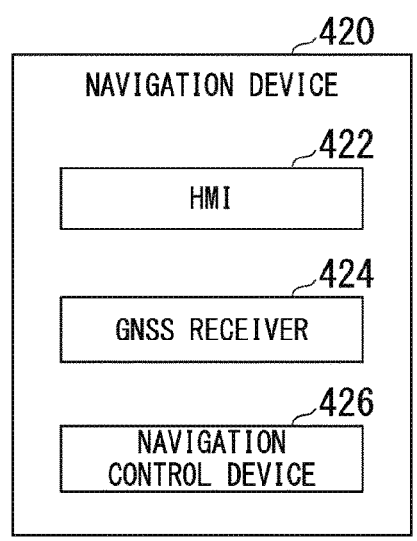
FIG. 5 is a diagram showing an example of a configuration of a navigation device 420 according to the embodiment.

FIG. 5 is a diagram showing an example of a configuration of the navigation device 420. The navigation device 420 includes, for example, a human machine interface (HMI) 422, a global navigation satellite system (GNSS) receiver 424, and a navigation control device 426. The HMI 422 includes, for example, a touch panel-type display device, a speaker, a microphone, or the like. The GNSS receiver 424 measures its position (the position of the vehicle 400) on the basis of radio waves arriving from a GNSS satellite (for example, a GPS satellite). The navigation control device 426 includes, for example, a CPU or various storage devices, and controls the entirety of the navigation device 420.

Map information (a navigation map) is stored in the storage device. The navigation map is a map in which roads are represented using nodes and links. The navigation control device 426 refers to the navigation map to determine a route to a destination designated using the HMI 422 from the position of the vehicle 400 measured by the GNSS receiver 424. In addition, the navigation control device 426 may transmit the position of the vehicle 400 and a destination to a navigation server (not shown) using the communication device 440, and acquire a route sent back from the navigation server. In addition, in the case of the present example, the route to a destination may be designated by the operation assistance device 500 as will be described later. The navigation control device 426 receives route information 561 to be described later from the operation assistance device 500.

Meanwhile, the route may include information on an arrival target time and a point at which a vehicle stops in order to allow a user to board or exit the vehicle. The navigation control device 426 outputs information on the route determined using any of the methods to the recommended lane determination device 470.

In addition, the navigation device 420 may transmit information relating to the current position of the vehicle 400 to the first home 10 serving as a transit point and an expected time of arrival at the first home 10 to the at-home judgment device 100. In a case where the vehicle 400 comes within a predetermined distance of the first home 10 or is within a predetermined time before an arrival time, the navigation device 420 may transmit approach information of the vehicle 400 to the at-home judgment device 100.

Referring back to FIG. 4, the in-vehicle monitoring unit 430 includes, for example, a camera provided inside the vehicle, and monitors the state of an occupant. The in-vehicle monitoring unit 430 transmits the monitoring state to the at-home judgment device 100 or the terminal device 200 through the network NW.

In the at-home judgment device 100, the information acquisition unit 110 acquires the monitoring state of the in-vehicle monitoring unit 430, and the monitoring state is displayed on the input and output unit 140. In the terminal device 200, the information management unit 210 acquires the monitoring state of the in-vehicle monitoring unit 430, and the monitoring state is displayed on the input and output unit 220.

The in-vehicle monitoring unit 430 detects, for example, a change in the state of an occupant such as a tantrum in a child who is an occupant as a threshold, and transmits notification information to the at-home judgment device 100 on the basis of the threshold. In addition, in a case where only a child (infant)'s boarding of the vehicle 400 is detected, the in-vehicle monitoring unit 430 may output a control signal to the autonomous driving control device 460 to start the vehicle 400, or display a confirmation screen on the input and output unit 140 of the at-home judgment device 100 or the input and output unit 220 of the terminal device 200.

The in-vehicle monitoring unit 430 may deliver an in-vehicle status to the first home 10 in a streaming manner, using the communication device 440, on a route on which the vehicle 400 travels toward the first home 10. In this case, the situation of the first user from the first home 10 which is a transit point may be displayed on the display unit such as the in-vehicle HMI 422.

The communication device 440 is, for example, a wireless communication module, connected to the network NW, which communicates directly with the at-home judgment device 100 or the operation assistance device 500. The communication device 440 performs wireless communication on the basis of Wi-Fi (registered trademark), DSRC, Bluetooth (registered trademark), or another communication standard.

The recommended lane determination device 470 includes, for example, a map positioning unit (MPU) and various storage devices. High-accuracy map information which is more detailed than the navigation map is stored in the storage device. The high-accuracy map information includes, for example, information such as a road width or gradient for each lane, curvature, or the position of a signal. The recommended lane determination device 470 determines a preferred recommended lane in order to travel along a route which is input from the navigation device 420, and outputs the determined recommended lane to the autonomous driving control device 460.

The autonomous driving control device 460 includes one or more processors such as a CPU or a micro processing unit (MPU) and various storage devices. The autonomous driving control device 460 causes the vehicle 400 to travel autonomously while avoiding contact with an object of which the position or speed is input from the outside monitoring unit 410 with travel in the recommended lane determined by the recommended lane determination device 470 as a principle. The autonomous driving control device 460 sequentially executes, for example, various events.

Examples of the events include a constant-speed traveling event of traveling in the same traveling lane at a constant speed, a following traveling event of following a preceding vehicle, a lane change event, a merging event, a divergence event, an emergency stop event, a tollbooth event for passing a tollbooth, a handover event for terminating autonomous driving and switching to manual driving, and the like. In addition, during execution of these events, an event for avoidance may be planned on the basis of the surrounding situation (such as the presence of a nearby vehicle or pedestrian or lane narrowing caused by road construction) of the vehicle 400.

The autonomous driving control device 460 generates a target trajectory along which the vehicle 400 will travel in the future. The target trajectory includes, for example, a speed element. For example, the target trajectory is represented as points (trajectory points) lined up in order to be reached by a host vehicle. A trajectory point is a point to be reached by the host vehicle for each predetermined traveling distance, and aside from this, target speed and target acceleration for each predetermined sampling time (for example, approximately several tenths of a [sec]) are generated as a portion of the target trajectory. In addition, the trajectory point may be a position, for each predetermined sampling time, to be reached by the host vehicle at the sampling time. In this case, information of the target speed or the target acceleration is represented by an interval between trajectory points.

Figure 6:
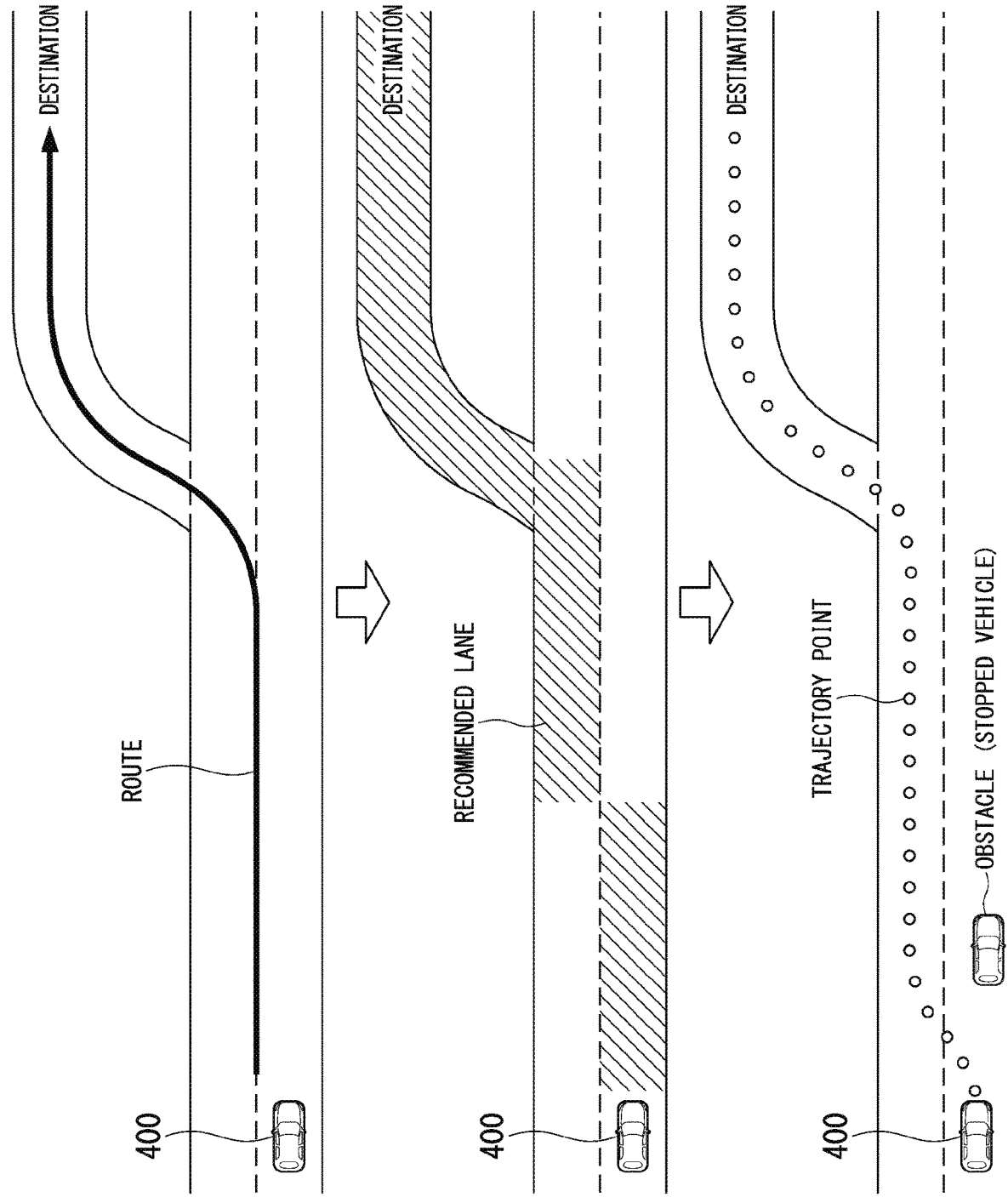
FIG. 6 is a diagram showing a process stage of autonomous driving according to the embodiment.

FIG. 6 is a diagram showing a process stage of autonomous driving. First, as shown in the upper diagram, a route is determined by the navigation device 420. This route is, for example, a rough route in which lanes are not distinguished from each other. Next, as shown in the middle diagram, the recommended lane determination device 470 determines a recommended lane in which a vehicle has a tendency to travel along a route.

As shown in the lower diagram, the autonomous driving control device 460 generates trajectory points for traveling along a recommended lane if possible while avoiding obstacles or the like, and controls some or all of the drive force output device 480, the brake device 481, and the steering device 482 to travel along the trajectory points (and an associated speed profile). Meanwhile, such sharing of roles is merely an example, and, for example, the autonomous driving control device 460 may centrally perform a process.

The drive force output device 480 outputs a traveling drive force (torque) for a vehicle to travel to a driving wheel. The drive force output device 480 includes, for example, a combination of an internal-combustion engine, an electric motor, a transmission or the like, and a power ECU that controls these components. The power ECU controls the above components in accordance with information which is input from the autonomous driving control device 460 or information which is input from a driving operator (not shown).

The brake device 481 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the autonomous driving control device 460 or the information which is input from the driving operator, and causes a brake torque according to a braking operation to be output to each wheel.

The brake device 481 may include a mechanism that transfers hydraulic pressure generated by the operation of a brake pedal included in the driving operator through a master cylinder to the cylinder as a backup. Meanwhile, the brake device 481 is not limited to the above-described configuration, and may be an electronic control type hydraulic pressure brake device that controls an actuator in accordance with the information which is input from the autonomous driving control device 460 and transfers hydraulic pressure of the master cylinder to the cylinder.

The steering device 482 includes, for example, a steering ECU and an electric motor. The electric motor changes the direction of a turning wheel, for example, by causing a force to act on a rack and pinion mechanism. The steering ECU drives the electric motor in accordance with the information which is input from the autonomous driving control device 460 or the information which is input from the driving operator, and changes the direction of the turning wheel.

[Operation Assistance Device]

Referring back to FIG. 1, the operation assistance device 500 is a management terminal that manages the operation of the vehicle 400. The operation assistance device 500 may be a general-purpose device such as, for example, a personal computer, a smartphone, or a tablet terminal. The operation assistance device 500 includes, for example, an authentication unit 510, an information acquisition unit 520, a schedule determination unit 530, a communication device 540, and a storage unit 560. The communication device 540 communicates bidirectionally with the at-home judgment device 100, the terminal device 200, and the vehicle 400 through the network NW.

The communication device 540 includes an NIC for connection to the network NW. The communication device 540 may have a function for a user to communicate with the first home 10 or the vehicle 400. The storage unit 560 stores, for example, the route information 561, first user information 562, and second user information 563.

The storage unit 560 is realized by, for example, a RAM, a ROM, an HDD, a flash memory, a hybrid-type storage device in which a plurality of such elements are combined, or the like.

The authentication unit 510, the information acquisition unit 520 and the schedule determination unit 530 are realized by, for example, a processor such as a CPU executing a program. In addition, some or all of these functional units may be realized by hardware such as an LSI, an ASIC, or an FPGA, or may be realized by software and hardware in cooperation.

The authentication unit 510 refers to the first user information 562 and the second user information 563 which are stored in the storage unit 560 to authenticate the first user and the second user included in a user group. The authentication is performed, for example, in a case where the second user starts up the schedule management program of the terminal device 200.

The first user information 562 includes, for example, information relating to the first user such as the first user's ID, name, address, contact address while at home or contact address while away, e-mail address, or items similar to these. The contact address while at home includes information of a means of contacting the first user in a case where it is determined that the first user is at home. The second user information 563 includes, for example, information relating to the second user such as the second user's ID, name, address, or contact address, e-mail address, or items similar to these.

The information acquisition unit 520 starts an operation using a trigger for acquiring the situation of a transit point. The information acquisition unit 520 starts an operation, for example, using the reception of a query of whether or not to welcome and send off the third user from the schedule management program of the terminal device 200 as a trigger. In addition, the information acquisition unit 520 may start an operation using a timing at which autonomous driving of the vehicle 400 is started and a series of processes relevant to route determination performed by another processing unit to be described later are terminated or a timing of a predetermined period interval as a trigger.

The information acquisition unit 520 acquires information relating to the situation of a transit point of autonomous driving. The situation is, for example, whether the first user of a transit point is at home. This situation is determined by the at-home judgment device 100 as described above.

The schedule determination unit 530 performs schedule adjustment for the second user to welcome and send off the third user. The performing of adjustment involves, for example, making a dynamic determination of whether or not to pass a transit point with respect to a schedule in which a general outline is determined.

The schedule determination unit 530 refers to the information acquired by the information acquisition unit 520 to decide whether the third user can be left with the first user. In a case where the first user is at home, the schedule determination unit 530 determines that the third user can be left. The schedule determination unit 530 may make a decision by adding other information. In addition, the at-home judgment device 100 may collect only objective information on an at-home decision (only power consumption), and it may be determined in the operation assistance device 500 whether a user is at home.

In a case where it is decided that the first user is at the first home 10, the schedule determination unit 530 determines whether the second user can leave the third user with the first user on the basis of the first schedule 351 and the second schedule 352. The schedule determination unit 530 determines an operation route of the vehicle 400 on the basis of the decision result.

The schedule determination unit 530 determines the route information 561 relating to a route of an autonomously driven vehicle on the basis of the second schedule 352. The schedule determination unit 530 determines, for example, a route by connecting a destination to pass among destinations such as the first home 10, the second home 20, a station, a school, and a day nursery which are registered in advance.

The schedule determination unit 530 determines, for example, a route in which the vehicle 400 passes a transit point on the basis of the second schedule 352 in which the third user can be left. In addition, the schedule determination unit 530 determines a route in which the vehicle 400 does not pass a transit point on the basis of the second schedule 352 in which the third user cannot be left. The schedule determination unit 530 transmits the determined route information 561 to the vehicle 400.

FIG. 7 is a diagram showing an example of content of the route information 561 which is generated by the schedule determination unit 530. The route information 561 is information in which each coordinate of a departure point, a transit point, and an arrival point and an assumed arrival time of the vehicle 400 are associated with one another. The transit point and the arrival point are destinations in each section. Information on the transit point and the arrival point is given to the vehicle 400 by the schedule determination unit 530.

The schedule determination unit 530 transmits the route information 561 to the vehicle 400 through the communication device 540. In the schedule determination unit 530, the second schedule 352 of the second user is transmitted to the scheduler providing device 300 through the communication device 540.

Figure 8:
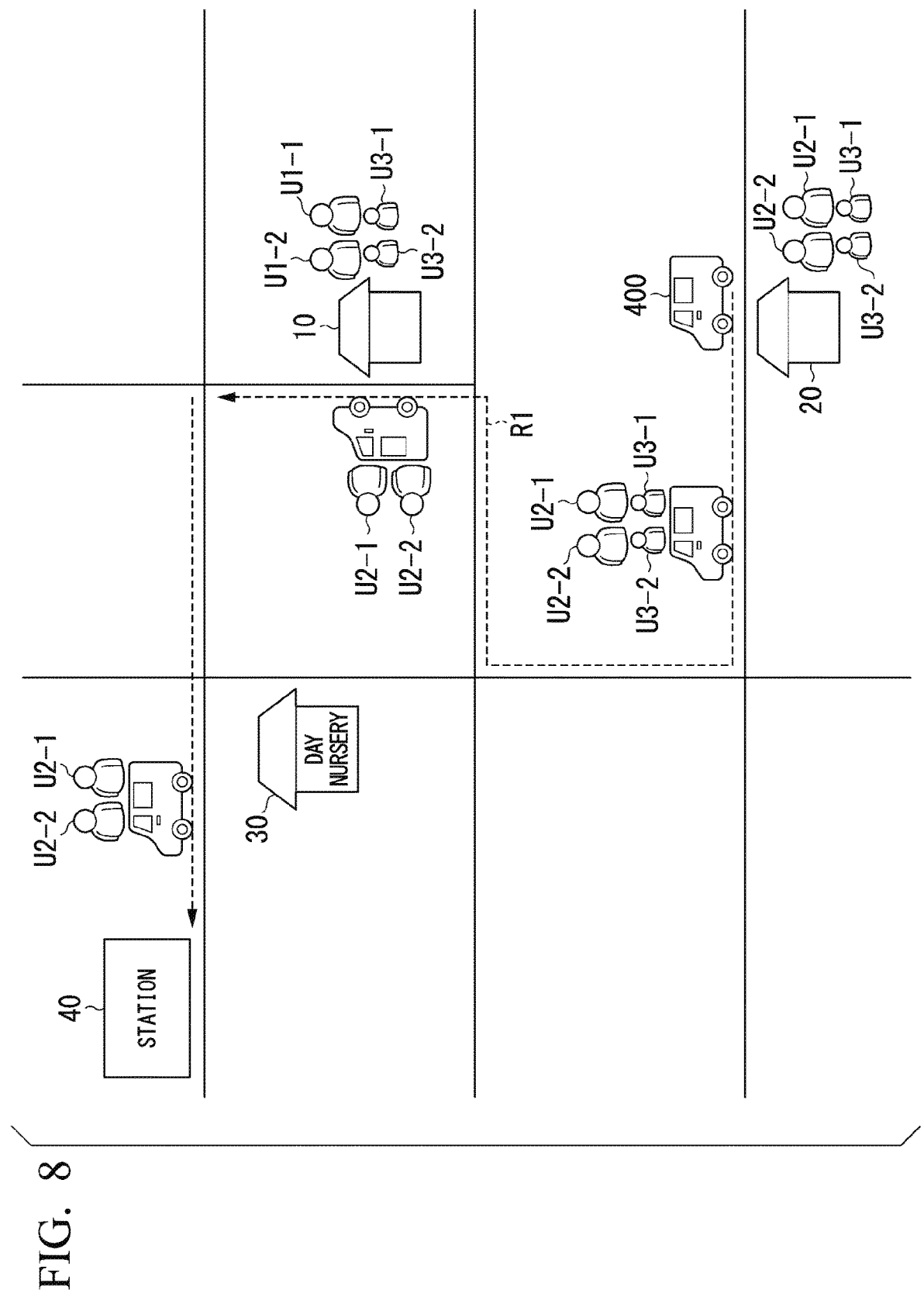
FIG. 8 is a diagram showing an example of a route R1 of the vehicle 400 which is determined by the schedule determination unit 530 according to the embodiment.

FIG. 8 is a diagram showing an example of a route R1 of the vehicle 400 which is determined by the schedule determination unit 530. For example, in a case where it is decided that third users U3-1 and U3-2 can be left with the second user, the schedule determination unit 530 determines that the vehicle 400 will pass the first home 10, and determines the route R1 in which the vehicle arrives at a destination (a station 40) from the second home 20 after passing the first home 10 using autonomous driving.

The vehicle 400 picks up, for example, second users U2-1 and U2-2 and a third user P3 at the second home 20 which is a departure point. The vehicle 400 first travels to the first home 10 which is a transit point in accordance with the determined route R1. A second user P2 leaves the third users U3-1 and U3-2 with first users U1-1 and U1-2 at the first home 10. Thereafter, the vehicle 400 delivers the second user P2 to the station 40 which is a destination along the route R1.

Figure 9:
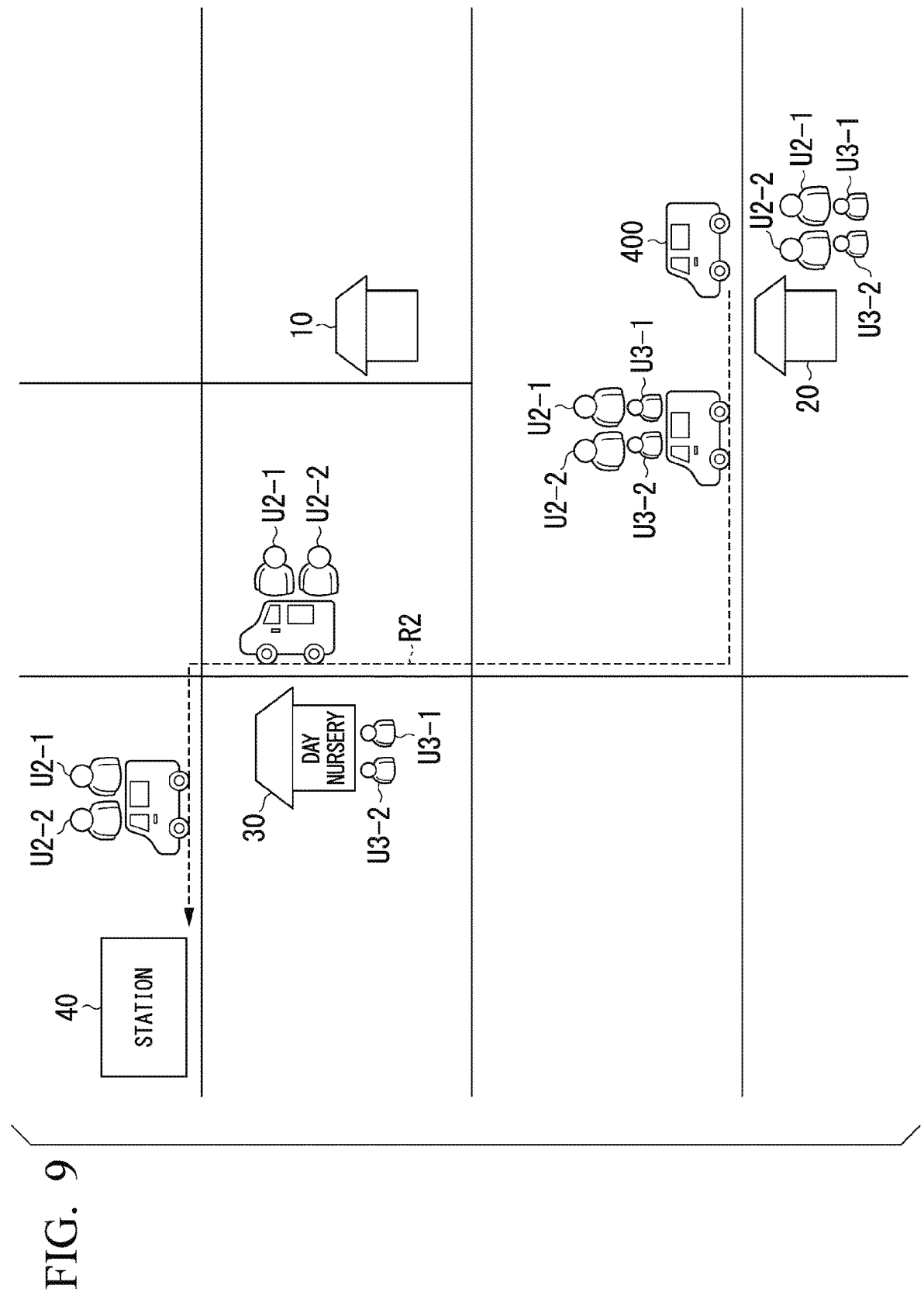
FIG. 9 is a diagram showing an example of another route R2 of the vehicle 400 which is determined by the schedule determination unit 530 according to the embodiment.

FIG. 9 is a diagram showing an example of another route R2 of the vehicle 400 which is determined by the schedule determination unit 530. For example, in a case where it is decided that the third users U3-1 and U3-2 cannot be left, the schedule determination unit 530 determines that the vehicle 400 will not pass the first home 10, and determines a route in which the vehicle does not pass the first home 10 using autonomous driving. The vehicle 400 does not pass the first home 10 in accordance with the determined route R2, and travels to a day nursery 30 which is a destination. The second users U2-1 and U2-2 leave the third users U3-1 and U3-2 at the day nursery 30. Thereafter, the vehicle 400 delivers the second users U2-1 and U2-2 to the station 40 which is a destination along the route R2.

Next, a schedule adjustment method which is executed by the schedule determination unit 530 will be described in detail.

Figure 10:
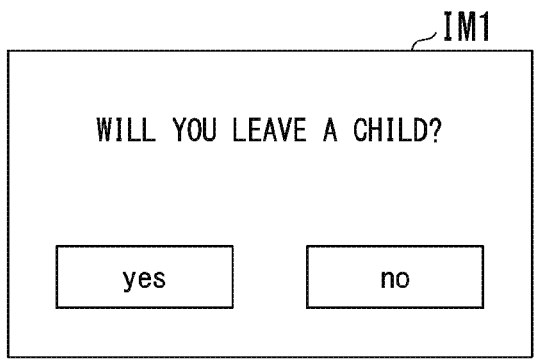
FIG. 10 is a diagram showing an example of a confirmation screen IM1 for selecting whether to leave a third user according to the embodiment.

In a case where the second user starts up the schedule management program of the terminal device 200, in the terminal device 200, a confirmation screen for selecting whether to leave the third user is displayed on the input and output unit 220. FIG. 10 is a diagram showing an example of a confirmation screen IM1 for selecting whether to leave the third user.

In a case where the second user selects to leave the third user in the confirmation screen IM1, the schedule determination unit 530 accesses the behavior monitoring unit 120 using this selection as a trigger, and acquires information relating to the situation of the first user's location. The schedule determination unit 530 determines whether the first user is at home on the basis of the acquired information. In a case where the first user is at home, the schedule determination unit 530 acquires the first schedule 351, and extracts a time slot in which the first user can leave the third user on the basis of the first schedule 351.

The schedule determination unit 530 further acquires the second schedule 352, and narrows down the extracted time slot of the first schedule 351 on the basis of the second schedule 352. That is, the schedule determination unit 530 extracts an overlapping time slot between the extracted time slot of the first schedule 351 and a time slot for welcoming and sending off the third user using autonomous driving at the second schedule 352. The schedule determination unit 530 determines whether the second user can leave the third user with the first user on the basis of the presence or absence of the extracted overlapping time slot. In a case where there is an overlapping time slot, the schedule determination unit 530 determines that the second user can leave the third user with the first user.

In a case where it is decided that the second user can leave the third user with the first user, the schedule determination unit 530 determines an operation start time of the vehicle 400 in the narrowed-down time slot (the overlapping time slot).

The schedule determination unit 530 notifies the at-home judgment device 100 of update information including the determined operation start time.

Figure 11:
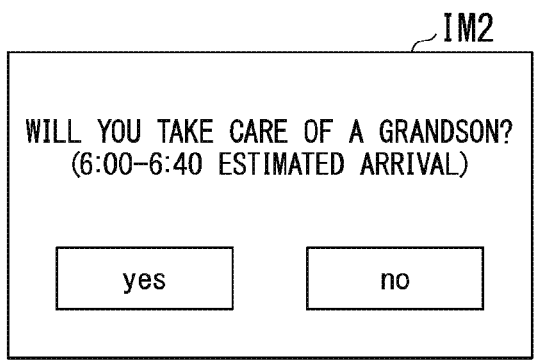
FIG. 11 is a diagram showing an example of a confirmation screen IM2 for selecting whether to take care of the third user according to the embodiment.

In a case where the operation assistance device 500 transmits update information of the second schedule 352 to the at-home judgment device 100, in the at-home judgment device 100, the schedule screen control unit 130 causes a display unit to display an image for querying whether to consent to take care of the third user on the basis of the update information. FIG. 11 is a diagram showing an example of a confirmation screen IM2 for selecting whether to take care of the third user.

In a case where the first user consents to take care of the third user, the schedule screen control unit 130 updates the first schedule 351 in the scheduler providing device 300. FIG. 12 is a diagram showing an example of content of the updated first schedule 351.

A notification of the first user's consent is transmitted to the operation assistance device 500 from the at-home judgment device 100 on the basis of the first user's consent. The schedule determination unit 530 requests the scheduler providing device 300 to reflect information other than the operation start time on the basis of the notification of the first user's consent.

FIG. 13 is a diagram showing an example of content of the updated second schedule 352. In the second schedule 352 updated by the scheduler providing device 300, a schedule of welcome and send-off in which the vehicle 400 passes a transit point is added, and the operation start time of the vehicle 400 is changed.

Figure 14:
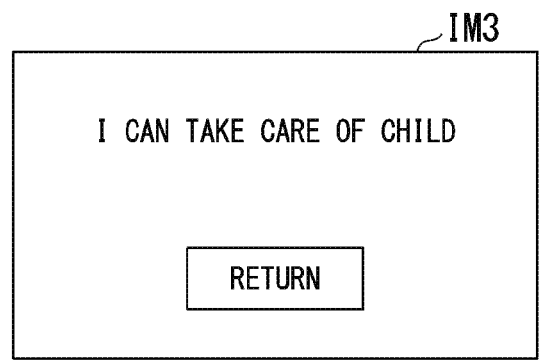
FIG. 14 is a diagram showing an example of a screen IM3 indicating that the third user can be taken care of according to the embodiment.

For example, the second user executes the schedule management program in the terminal device 200 in Monday morning, and performs a query for leaving the third user. As a result of the query, in a case where there is a response from the first user that the user can leave the third user, the second schedule 352 is updated to a schedule to leave the third user as shown in the drawing. In this case, the schedule determination unit 530 transmits a notification indicating that the first user's consent has been obtained to the terminal device 200. In the terminal device 200, a display screen indicating taking care of the third user is displayed on the input and output unit 220. FIG. 14 is a diagram showing an example of a screen IM3 indicating the possibility of taking care of the third user.

Figure 15:
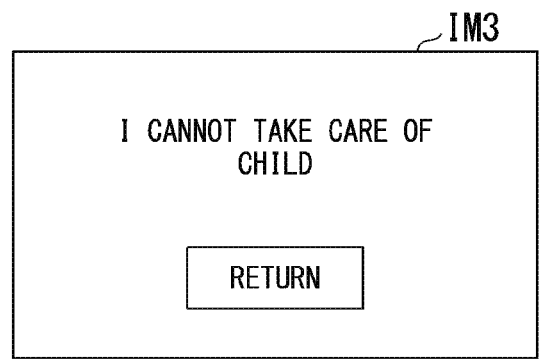
FIG. 15 is a diagram showing an example of a screen IM4 indicating that the third user cannot be taken care of according to the embodiment.

In a case where there is no overlapping time slot between a time slot extracted from the first schedule 351 and a time slot for welcoming and sending off the third user in the second schedule 352, the schedule determination unit 530 determines that it is not possible to take care of the third user. The schedule determination unit 530 transmits a notification indicating that it is not possible to take care of the third user to the terminal device 200. In the terminal device 200, a display screen indicating that it is not possible to take care of the third user is displayed on the input and output unit 220. FIG. 15 is a diagram showing an example of a screen IM4 indicating that it is not possible to take care of the third user.

Furthermore, in a case where the at-home judgment device 100 has received a notification that the first user does not consent to take care of a child from the first user, or a case where the first user's response is not obtained in a predetermined period, the schedule determination unit 530 transmits a notification indicating that it is not possible to take care of the third user to the terminal device 200.

In addition, in a case where the first schedule 351 is not obtained, the schedule determination unit 530 causes the information acquisition unit 520 to acquire the at-home situation of the first user from the at-home judgment device 100, and confirms the at-home situation. In a case where the first user is at home, the schedule determination unit 530 causes the at-home judgment device 100 to perform a query for leaving the third user to the first user. In a case where consent is obtained from the first user, the schedule determination unit 530 instructs the vehicle 400 to select a route in which the vehicle passes a transit point.

[Process Flow]

Figure 16:
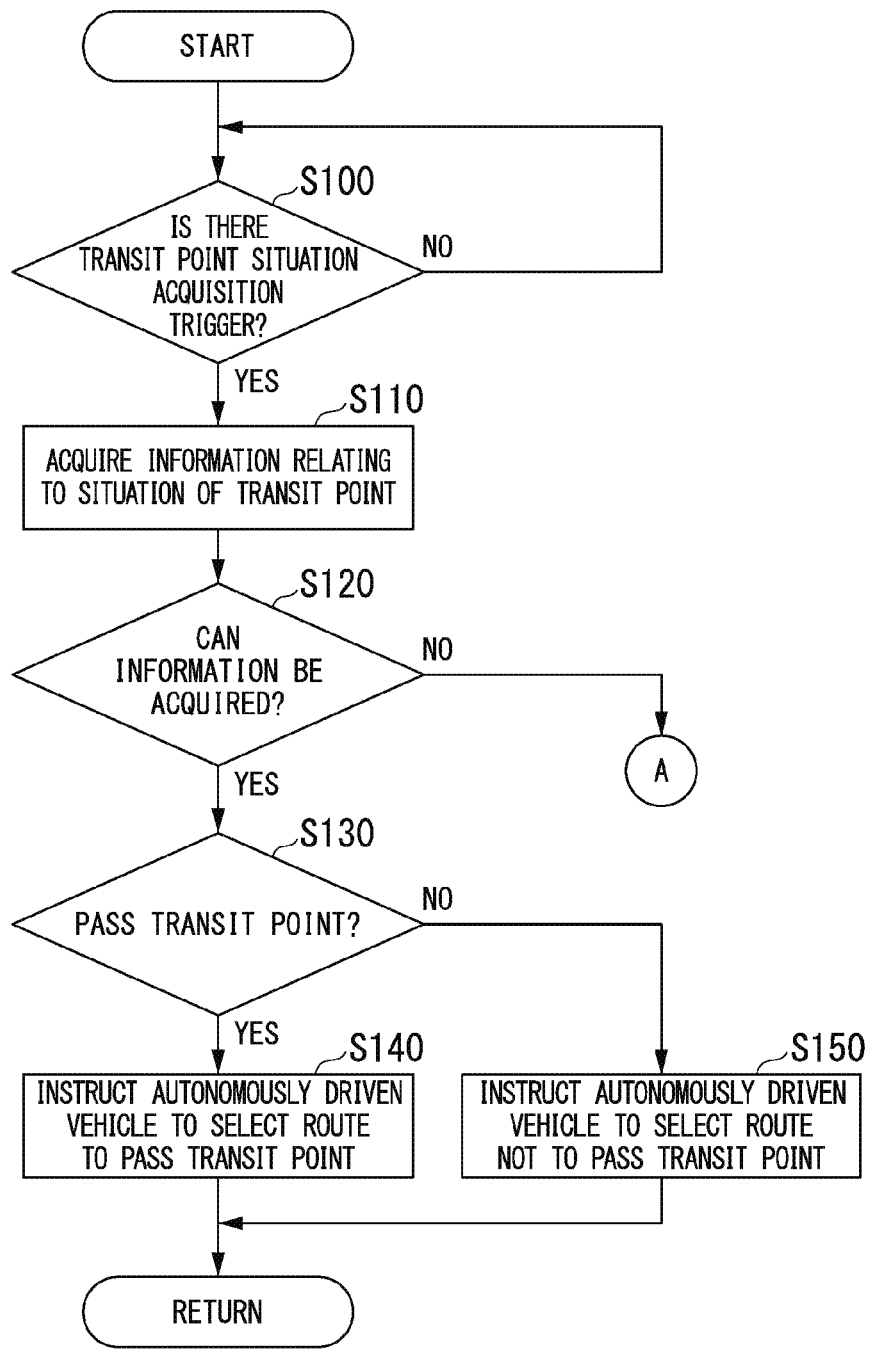
FIG. 16 is a flow chart showing an example of a flow of processes which are executed by a vehicle control system 1 according to the embodiment.
Figure 17:
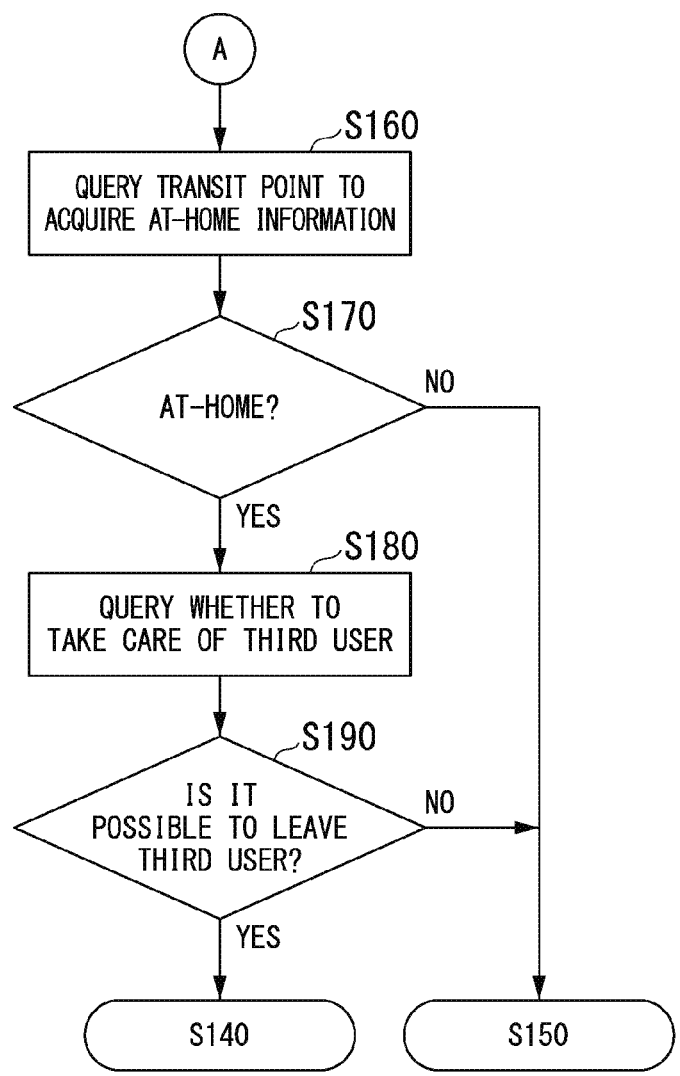
FIG. 17 is a flow chart showing an example of a flow of processes which are executed by the vehicle control system 1 according to the embodiment.

Hereinafter, a flow of processes which are executed by the vehicle control system 1 will be described. FIGS. 16 and 17 are flow charts showing an example of a flow of processes which are executed by the vehicle control system 1. The information acquisition unit 520 starts a process using a trigger for acquiring the situation of a transit point (step S100). The information acquisition unit 520 accesses the behavior monitoring unit 120, and acquires information relating to the situation of a transit point which is the first home 10 of the first user (step S110).

In a case where the information is acquired (step S120), the schedule determination unit 530 refers to the acquired information, to decide whether the second user having a specific relationship with the first user can leave the third user with the first user (step S130).

In a case where it is decided that it is possible to passes a transit point, the schedule determination unit 530 instructs the vehicle 400 to select a route in which the vehicle passes the transit point (step S140). In a case where a result in step S110 is negative, the schedule determination unit 530 instructs the vehicle 400 to select a route in which the vehicle does not pass the transit point (step S150).

An example of a situation in which a negative decision is obtained in step S120 includes a case where the first schedule 351 is not obtained. In a case where the decision in step S120 is negative, the schedule determination unit 530 confirms the at-home situation of the first user (step S160).

In a case where the first user is at home (step S170), the schedule determination unit 530 causes the at-home judgment device 100 to perform a query for leaving the third user with the first user (step S180).

In a case where consent is obtained from the first user (step S190), the schedule determination unit 530 performs the process of step S140, and sets a route in which the vehicle passes the transit point. In a case where the first user is not at home in step S170 or consent is not obtained, the schedule determination unit 530 performs the process of step S150, and instructs the vehicle 400 to select a route in which the vehicle does not pass the transit point.

The above process flows of the vehicle control system 1 are executed in, for example, the following situations.

(1) For example, according to the vehicle control system 1, the second user (parent) who resides in the second home 20 leaves the third user (child) with the first user (grandparents) who resides in the first home 10 in the middle of a route in which the first user boards the vehicle 400 to a station, the second user goes to the station thereafter, and the vehicle 400 can return to the second home through autonomous driving (steps S100 to 140). The first user delivers the third user to a school, a day nursery or the like at a predetermined time, or keeps leaving the third user until the second user's time to go home.

(2) For example, in a case where the second user performs a query of whether it is possible to leave the third user on holidays (weekdays are also ok) by operating the terminal device 200, and then the first user's schedule to be at home is not clear in the first schedule 351 of the first user, the operation assistance device 500 queries the first user about whether it is possible to leave the third user. According to the vehicle control system 1, in a case where the first user is at the first home 10, and the first user can take care of the third user, the second user can leave the third user with the first user of the first home using the vehicle 400 (steps S160 to S190).

(3) For example, in a case where the first user is away from the first home 10 due to some kind of cause while the vehicle 400 starts to travel in a route in which it passes a transit point on the basis of the first schedule 351 in which the first user is at home, the vehicle control system 1 selects step S150 in step S130 in a flow of a new process after step S140, whereby the vehicle 400 can automatically change the route to another destination such as a day nursery.

(4) In a case where the first user is at the first home 10 and can take care of a child while the vehicle 400 starts to travel in a route in which it does not pass the transit point on the basis of the first schedule 351 in which the first user is away, the vehicle control system 1 selects step S140 in step S130 in a flow of a new process after step S150, whereby the vehicle 400 can automatically change the above route to a route in which the vehicle passes the transit point.

According to the above-described the vehicle control system 1, the second user can leave the third user with the second user's home using the vehicle 400 of autonomous driving in accordance with the first user's schedule. In addition, the vehicle control system 1 can automatically generate the first user's schedule by monitoring the first user's behavior, and watch over the first user.

Further, the vehicle control system 1 can automatically determine a time at which it is possible to leave the third user by comparing the first user's schedule with the second user's schedule. The vehicle control system 1 can transmit the in-vehicle situation of the vehicle 400 to the first user, and the first user can obtain a feeling of happiness through communication with the third user.

MODIFICATION EXAMPLE

Hereinafter, a modification example of the vehicle control system 1 will be described. The vehicle control system 1 may be used in the delivery of baggage. In the following description, the same components as those in the above embodiment are denoted by the same names and signs, and the description thereof will not be given. In the following, a first user U1, a second user U2 and a third user U3 will be described. In addition, the drawings used in the above embodiment are assumed to be appropriately replaced in accordance with the aspects of the first user U1, the second user U2 and the third user U3.

The vehicle control system 1 may be applied to, for example, the delivery of a commercial product after a user (first user U1) has ordered a commercial product to a trader (the third user U3) that provides a commercial product or the like. The operation owner (the second user U2) of the autonomously driven vehicle receives, for example, a request of a trader who performs mail order sales or the like, loads ordered commercial products or the like into the vehicle 400, and delivers the commercial products to a user's home. The vehicle 400 of autonomous driving determines a route in which it passes the user's home (a transit point or a destination) in accordance with a schedule in which the first user U1 is at home.

The first user U1 has, for example, a specific relationship such as execution of a contract with the operation owner of the vehicle 400 who is the second user U2 with respect to use of the vehicle 400 in share ride, use of the vehicle in the delivery of baggage, or the like. The use of the vehicle 400 includes, for example, mounting of an article or occupation of a space in addition to boarding of the vehicle 400. The mounting of an article refers to, for example, transporting baggage such as a commercial product to the vehicle 400. The occupation of a space refers to, for example, securing of a mounting space for baggage or the like in the vehicle 400 in a case where the vehicle 400 is called over in order to deliver baggage from the user's home. The occupation of a space may be securing of a boarding space in a case where the vehicle 400 is called over to the user's home for the purpose of boarding.

The second user U2 is, for example, an owner of the vehicle 400 which is an autonomously driven vehicle. The second user U2 provides a third party with the vehicle 400 which is an autonomously driven vehicle. The second user U2 causes the vehicle 400 to autonomously travel while the user does not drive the vehicle 400 by himself (or herself). The third party uses the vehicle 400 in a predetermined usage form. The third party uses the vehicle 400 by boarding the vehicle 400 or delivering baggage. The second user U2 may be constituted by a plurality of owners who manage one vehicle 400, or may be constituted by a single or a plurality of owners who manage a plurality of vehicles 400 which are targets for autonomous traveling.

The second user U2 can provide information of the first user U1 to the third user U3 through a contract with the first user U1. However, the second user U2 can provide the information of the first user U1 in a range in which the first user U1 gives an access authority. The information in a range in which the first user U1 gives an access authority is, for example, a minimum amount of information required for the third user U3 to provide a service, and includes at-home information based on the schedule of the first user U1 or GPS information of a terminal device which is used by the first user U1. The first user U1 can also release the second user U2's provision of the information of the first user U1 to the third user U3.

The third user U3 is, for example, a person who provides an article or a service to a user. The third user U3 has, for example, a specific relationship such as execution of a contract with the second user U2 with respect to the delivery of baggage such as a commercial product using the vehicle 400. The third user U3 is, for example, a corporation or an individual who provides articles or services relevant to mail order sales, food sales, construction, repair, medical care, nursing, or the like. The third user U3 manages, for example, a server device that provides a service. The third user U3 provides a service to the first user U1 who is a user through the server device.

Next, an example of transport of an article or the like using the vehicle control system 1 will be described. The first user U1 accesses a website provided by a server device such as a shopping server managed by the third user U3 from a terminal device such as, for example, a personal computer, a tablet-type terminal, or a smartphone, and performs a procedure of purchasing a commercial product desired to be purchased.

When designating the delivery date and time of a commercial product in a procedure of purchasing a commercial product, the first user U1 performs an input operation on information relating to a desired date and time on the procedure screen of a website. In a case where the delivery date and time of a commercial product is not designated, the first user U1 ends the purchase procedure without inputting the information relating to the delivery date and time.

A server device under the management of the third user U3 in which information relating to the first user U1's purchase of a commercial product is input accesses the operation assistance device 500, and starts a schedule relating to the delivery of a commercial product to the first user U1.

The server device under the management of the third user U3 queries the terminal device 200 of the second user U2 on the basis of information which is input by the first user U1, and requests the delivery of a commercial product using the vehicle 400. The terminal device 200 starts to request for the management of operation of the vehicle 400 from the operation assistance device 500.

In the operation assistance device 500, the authentication unit 510 acquires information from the terminal device 200, and the third user U3 starts to decide whether a commercial product can be delivered to the first user U1 using the vehicle 400 of the second user U2.

The authentication unit 510 determines whether there is a specific relationship between the first user U1 and the second user U2. It is decided that there is a specific relationship such as the presence of a contract relating to the use of the vehicle 400 between the first user U1 and the second user U2, the authentication unit 510 causes the information acquisition unit 520 to determine the first home 10 of the first user U1 as the transit point of the vehicle 400.

In a case where the second user U2 has an authority to access information relating to the use of the vehicle 400 of the first user U1, the second user U2 acquires information required for the operation of the vehicle 400 such as a schedule of the first user U1, and provides the information of the first user U1 to the third user U3 in the range of the access authority. The third user U3 plans a schedule to send out a commercial product on the basis of the provided information.

Here, the operation assistance device 500 includes a first authentication unit and a second authentication unit in the authentication unit 510. The first authentication unit authenticates the first user U1. The second authentication unit authenticates the second user U2.

The information acquisition unit 520 accesses the first schedule 351 stored in the storage unit 350 of the scheduler providing device 300 on the basis of the result of authentication performed by the first authentication unit, and acquires information relating to the position of the first home 10 of the first user U1 which is a transit point of the vehicle 400 or the schedule of the first user U1. An information transmission device configured between the communication device 540 of the operation assistance device 500 and the transmission and reception unit 320 of the scheduler providing device 300 is defined as a first interface. That is, the information acquisition unit 520 acquires information relating to the transit point of the vehicle 400 through the first interface.

The information acquisition unit 520 transmits a notification for obtaining a permission to visit the first home 10 using the vehicle 400 and deliver a commercial product to a terminal device used by the first user U1 on the basis of the result of authentication performed by the second authentication unit, and acquires information such as a response or the like indicating a permission from this terminal device. The information acquisition unit 520 acquires information relating to whether the first user U1 is at the first home 10 which is a transit point from the terminal device on the basis of the permission, or position information from a position sensor such as a GPS sensor built into the terminal device within the range of the access authority.

An information transmission device configured between the communication device 540 of the operation assistance device 500 and a transmission and reception unit of the terminal device used by the first user U1 is defined as a second interface. That is, the information acquisition unit 520 transmits executor information of the vehicle 400 to the terminal device used by the first user U1, and acquires information relating to the transit point through the second interface.

The information acquisition unit 520 communicates with the vehicle 400 on the basis of the result of authentication performed by the second authentication unit, and acquires information relating to the current position of the vehicle 400 or an operation schedule. An information transmission device configured between the communication device 540 of the operation assistance device 500 and the communication device 440 of the vehicle 400 is defined as a third interface. The information acquisition unit 520 calculates whether the vehicle 400 can travel in a route in which it passes the transit point on the basis of information acquired from the first interface, the second interface and the third interface.

The operation assistance device 500 starts an operation, for example, using the reception of a query of whether or not to transport baggage P of the third user from the schedule management program of the terminal device 200 or a server device 600 as a trigger, and sets the transit point or destination of the vehicle 400. In addition, after autonomous driving of the vehicle 400 is planned or started, the information acquisition unit 520 resets the transit point or destination of the vehicle 400 using a change in the state of the first user U1 as a trigger as will be described later.

As a result of comparison between the schedule of the first user U1 acquired by the information acquisition unit 520 and the operation schedule of the vehicle 400, the schedule determination unit 530 extracts a time slot of stopover at the transit point according to the usage form of the third user on the basis of the schedule of the first user U1. The transit point is the first home 10 of the first user U1, but the transit point may be a destination.

The usage form of the third user includes a case where the third user U3 goes toward a destination while on board the vehicle 400 together with a commercial product and a case where the first user U1 takes down the commercial product at a destination with only the commercial product mounted in the vehicle 400. In the extraction of the stopover time slot, in a case where the delivery date and time designated by the first user U1 is acquired from the server device, the information acquisition unit 520 extracts a time slot at this date and time.

The schedule determination unit 530 determines whether the first home 10 of the first user U1 can be set to a destination or a transit point, with reference to the operation schedule of the vehicle 400, from the extracted time slot. In this case, the schedule determination unit 530 refers to the operation schedules of a plurality of vehicles 400 to select a vehicle 400 in which the first home 10 of the first user U1 can be set to a destination or a transit point, and narrows down a candidate time slot in which the commercial product is delivered.

The schedule determination unit 530 sets a route of the selected vehicle 400 so that the base of the third user U3 is set to a transit point and the first home 10 of the first user U1 is set to a destination or a transit point. The schedule determination unit 530 determines the start time of operation of the vehicle 400 that travels in the route which is set to correspond to the narrowed-down time slot. The schedule determination unit 530 reflects the operation start time in the schedule of the vehicle 400.

The schedule determination unit 530 transmits information relating to the determined operation to a terminal device used by the third user U3 through the communication device 540. The third user U3 acquires the operation schedule of the vehicle 400 through the terminal device used by the third user U3. The third user U3 sets a schedule to mount a commercial product in the vehicle 400 on the basis of information relating to a date and time when the vehicle 400 passes the base of the third user U3.

In a case where the schedule to mount a commercial product in the vehicle 400 can be executed, the third user U3 returns information indicating that a schedule is accepted in the operation assistance device 500. In a case where the schedule to mount a commercial product in the vehicle 400 cannot be executed, the third user U3 returns information indicating that a schedule is not accepted in the operation assistance device 500.

The schedule determination unit 530 notifies the terminal device of the first user U1 of the information relating to the determined operation through a communication unit using mail, a short message, a call or the like. The first user U1 can obtain information such an estimated time of arrival of a commercial product by receiving this notification in the terminal device.

In a case where a schedule to receive a commercial product from the vehicle 400 can be executed, the first user U1 returns information indicating that the schedule is accepted in the operation assistance device 500. In a case where the schedule to receive a commercial product from the vehicle 400 cannot be executed, the first user U1 returns information indicating that the schedule is not accepted in the operation assistance device 500. The schedule determination unit 530 determines the use states of the first user U1 and the third user U3.

The schedule determination unit 530 receives a response indicating that the schedule is accepted or not accepted from the first user U1 or the third user U3, for example, in a state in which a transit point is set in the vehicle 400.

In a case where the first user U1 and the third user U3 accept the schedule, the schedule determination unit 530 transmits information relating to the set operation schedule to the vehicle 400. The vehicle 400 receives the information relating to the operation schedule, and travels a route according to the operation schedule.

In addition, the schedule determination unit 530 transmits the information relating to the set operation schedule to the scheduler providing device 300 through the first interface, and updates the first schedule 351.

In addition, the schedule determination unit 530 transmits the information relating to the set operation schedule to the terminal device used by the first user U1 through the second interface, and notifies the first user U1 of the schedule of the vehicle 400 including information such as a date and time of arrival of a commercial product.

The schedule determination unit 530 resets the transit point of the vehicle 400 in a case where the set operation schedule is not accepted on the basis of content of a response acquired from the first user U1 or the third user U3, or a case where it is decided that a change in information relating to the first user U1 or the third user U3 has occurred.

The schedule determination unit 530 further determines the use of the third user U3, and resets the transit point of the vehicle 400 in a case where, as a result of the decision, the third user U3 uses the vehicle 400, and a change in a specific relationship between the first user U1 and the second user U2 occurs in a state in which a transit point is set in the vehicle 400.

That is, the schedule determination unit 530 makes it a condition that the transit point of the vehicle 400 is reset using a case where a response indicating that the set operation schedule is not accepted or the like has been accepted or a case where a change in a specific relationship between the first user U1 and the second user U2 has occurred as a trigger. A case where a change in a specific relationship between the first user U1 and the second user U2 has occurred includes, for example, a case where there are fluctuations in a received order of a commercial product or the like and a relationship of ordering. That is, a case where the second user U2 who is an operation subject has been changed, a case where the owner of the vehicle 400 has been changed, and a case where cancelation of a commercial product or the like has occurred are included.

In addition, a case where a change in a specific relationship between the first user U1 and the second user U2 has occurred also includes a case where the first user U1 restricts an authority to access the provision of information relating to the first user U1 from the second user U2. The restriction of an authority to access the provision of information includes the restriction of the entirety or a portion of information relating to the first user U1.

Further, a case where a change in a specific relationship between the first user U1 and the second user U2 has occurred also includes a case where a conditional relationship of each user or the vehicle 400 does not satisfy a condition according to a time or a route. For example, a case where an increase in time of route traveling due to the vehicle 400 stopping off at a transit point is above 30 minutes which is set as a threshold is included in a case where a condition according to a time is not satisfied.

Furthermore, a case where a change in a specific relationship between the first user U1 and the second user U2 has occurred also includes a case where there is access to information relating to the first user U1 at only a certain specific time, or a conditional relationship of a received order of a commercial product, a situation of ordering, an authority to access the information of the first user U1, or the like is not established.

The schedule determination unit 530 stops using the vehicle 400 intended to be used, for example, in a case where information indicating the occurrence of a change in information relating to at least one user of the first user U1, the second user U2 and the third user U3 is acquired. The schedule determination unit 530 selects another vehicle 400 suitable for a condition of a schedule or an authority to access information. The schedule determination unit 530 resets, for example, a route in which another vehicle 400 passes through a destination or a transit point on the basis of an operation schedule of another vehicle 400.

In a case where the operation schedule of the vehicle 400 is reset, the schedule determination unit 530 queries the first user U1 and the third user U3 about the resets operation schedule. In a case where information such as a response indicating the acceptance of the reset operation schedule is accepted, the schedule determination unit 530 transmits the reset operation schedule to the vehicle 400, and causes the vehicle 400 to travel in accordance with the operation schedule.

In a case where the vehicle 400 approaches the first home 10 of the first user U1 at a predetermined distance or within a predetermined time from an estimated time of arrival, a notification indicating that the vehicle 400 is approaching the terminal device of the first user U1 may be performed. The notification includes at least one of mail, a short message, and a voice call. The notification may be performed from any of the vehicle 400, the operation assistance device 500, the server device, the scheduler providing device 300 and the terminal device 200.

While preferred embodiments of the invention have been described and shown above, it should be understood that these are exemplary of the invention and are not to be considered as limiting. Additions, omissions, substitutions, and other modifications can be made without departing from the scope of the present invention.

For example, in case where the second user goes to separate destinations after the third user is left at the first home 10 which is a transit point, the operation assistance device 500 may allocate autonomously driven vehicles other than the vehicle 400 to the first home 10, and provide options so that the second user can arrive at separate destinations.

In this case, when autonomously driven vehicles other than the vehicle 400 are arranged, the schedule determination unit 530 may provide priority to vehicles to be arranged.

In addition, the transit point may be a store or a hospital in addition to a relative's residence, or a target to be left may be a pet or baggage in addition to a child. In addition, in a case where the first user of the first home 10 serving as a transit point designates a place other than the first home 10 such as a park as a transit point, the schedule determination unit 530 may determine a route using the designated place as a transit point.

In addition, in a case where a change exceeding a predetermined threshold is detected in the first user's life activities through an analysis of the measurement data 181, the behavior monitoring unit 120 may report the result to the second home 20 through the network NW using the communication device 150. Thereby, it is also possible to watch over the first user in the at-home judgment device 100.

What is claim is:

1. A vehicle control system comprising:
   an acquisition unit that acquires information relating to a situation of a transit point of autonomous driving; and
   a determination unit that determines whether an autonomously driven vehicle will pass the transit point based on the information acquired by the acquisition unit,
   wherein the acquisition unit acquires information relating to a first user that is the transit point and information relating to a second user that is an operation owner of the autonomously driven vehicle,
   the determination unit refers to the information acquired by the acquisition unit, determines whether there is a specific relationship between the first user and the second user, and determines that the autonomously driven vehicle will pass the transit point in a case where there is the specific relationship and the autonomously driven vehicle is used by a third user,
   the determination unit extracts a time slot of a stopover at the transit point according to an usage form of the third user based on a first schedule of the first user, and
   the determination unit narrows down a time slot serving as a candidate based on a second schedule of the second user from the extracted time slot, and determines a start time of operation of the autonomously driven vehicle in accordance with the narrowed-down time slot.

2. The vehicle control system according to claim 1, further comprising
   a communication unit that communicates with a terminal device of the first user,
   wherein the determination unit allows the terminal device of the first user to know information relating to the determined operation using the communication unit.

3. The vehicle control system according to claim 1,
   wherein the determination unit determines an usage of the third user, and sets the transit point of the autonomously driven vehicle again in a case where a change in information relating to the first user occurs in a state in which the transit point is set in the autonomously driven vehicle.

4. The vehicle control system according to claim 1, wherein the determination unit determines an usage of the third user, and sets the transit point of the autonomously driven vehicle again in a case where a change in a specific relationship between the first user and the second user occurs in a state in which the transit point is set in the autonomously driven vehicle.

5. The vehicle control system according to claim 1, wherein the determination unit reflects the operation start time in the second schedule.

6. A vehicle control method comprising causing a computer to:
   acquire information relating to a transit point of an autonomously driven vehicle, executor information of the autonomously driven vehicle that uses the information relating to the transit point, and user information of the autonomously driven vehicle;
   determine whether the autonomously driven vehicle will pass the transit point based on the acquired information,
   acquire information relating to a first user that is the transit point and information relating to a second user that is an operation owner of the autonomously driven vehicle;
   refer to the information acquired, determine whether there is a specific relationship between the first user and the second user, and determine that the autonomously driven vehicle will pass the transit point in a case where there is the specific relationship and the autonomously driven vehicle is used by a third user;
   extract a time slot of a stopover at the transit point according to an usage form of the third user based on a first schedule of the first user; and
   narrow down a time slot serving as a candidate based on a second schedule of the second user from the extracted time slot, and determine a start time of operation of the autonomously driven vehicle in accordance with the narrowed-down time slot.

7. The vehicle control method according to claim 6, further comprising:
   acquiring the information relating to the transit point of the autonomously driven vehicle through a first interface;
   transmitting the executor information of the autonomously driven vehicle to a terminal device and acquiring the information relating to the transit point through a second interface;
   communicating with the autonomously driven vehicle and acquiring information of the autonomously driven vehicle through a third interface; and
   calculating whether the autonomously driven vehicle will pass the transit point based on the information acquired from the first interface, the second interface and the third interface.

8. The vehicle control method according to claim 7, further comprising:
   performing authentication by a first authentication unit that allows information acquisition through the first interface;
   performing authentication by a second authentication unit that allows information acquisition through the second interface; and
   transmitting the information of the autonomously driven vehicle acquired from the third interface through the first interface or the second interface based on authentication results of the first authentication unit and the second authentication unit.

9. A non-transitory computer-readable recording medium comprising a program causing a computer to:
   acquire information relating to a transit point of an autonomously driven vehicle, executor information of the autonomously driven vehicle that uses the information relating to the transit point, and user information of the autonomously driven vehicle;
   determine whether the autonomously driven vehicle will pass the transit point based on the acquired information,
   acquire information relating to a first user that is the transit point and information relating to a second user that is an operation owner of the autonomously driven vehicle;
   refer to the information acquired, determine whether there is a specific relationship between the first user and the second user, and determine that the autonomously driven vehicle will pass the transit point in a case where there is the specific relationship and the autonomously driven vehicle is used by a third user;
   extract a time slot of a stopover at the transit point according to an usage form of the third user based on a first schedule of the first user; and
   narrow down a time slot serving as a candidate based on a second schedule of the second user from the extracted time slot, and determine a start time of operation of the autonomously driven vehicle in accordance with the narrowed-down time slot.

* * * * *